July 10, 1951 P. W. HAINKE 2,559,920
PLATFORM FOR LAWN MOWERS
Filed July 5, 1949
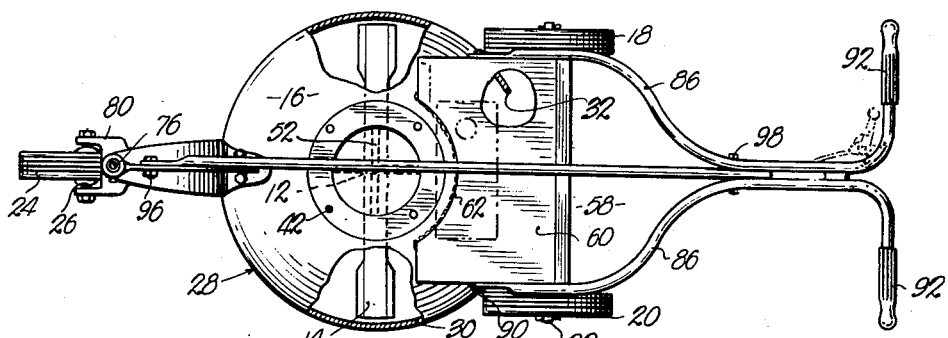
Fig. 1.
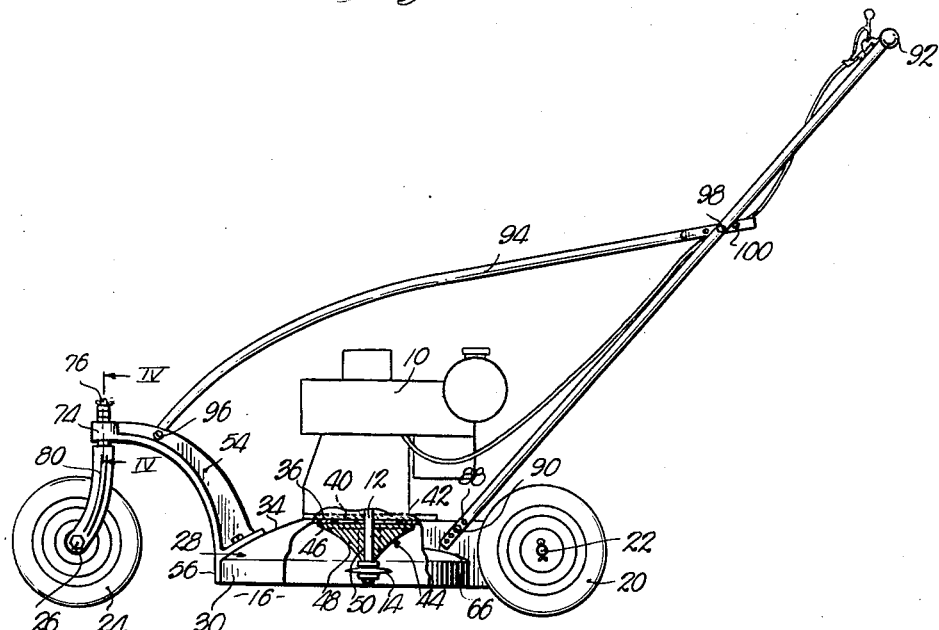
Fig. 2.
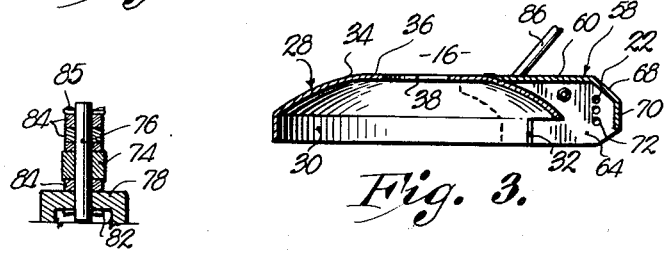
Fig. 4. Fig. 3.
INVENTOR.
Paul H. Hainke
BY
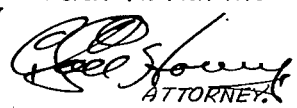
ATTORNEY.

Patented July 10, 1951

2,559,920

UNITED STATES PATENT OFFICE 2,559,920

PLATFORM FOR LAWN MOWERS

Paul W. Hainke, Hutchinson, Kans., assignor to The Paul Hainke Mower Corporation, Inc., Hutchinson, Kans., a corporation of Kansas Application July 5, 1949, Serial No. 103,003

1 Claim. (Cl. 56—25.4)

This invention relates to lawn mowers of the kind having a blade rotatable on a horizontal axis below a supporting platform therefor, the primary object being to improve upon the platform structure itself whereby to produce an inexpensive, attractive, durable combination of parts readily adaptable for mounting all of the supporting wheels for the mower, the prime mover, handle bars and rotatable drive shaft interconnecting the aforesaid blade and prime mover.

It is the most important object of this invention to provide platform structure for lawn mowers so formed and contoured as to be extremely rigid without the necessity of expensive, bulky and heavy supplemental bracing means commonly employed when flat, horizontal platforms are provided, the platform itself being dome-shaped and hollow to accommodate the rotating blade of the mower.

Another important object of the present invention is to provide a hollow, dome-shaped platform for lawn mowers wherein the top face thereof is flat to accommodate the prime mover and the down-turned flange portion or side wall of the platform is cut away to clear grass cuttings.

Another object of the present invention is to provide a hollow, laterally extending case on the main drum portion of the platform formed and adapted to protect the user of the mower, to mount the rear wheel and axle assembly of the mower and to receive the handle bar structure thereof.

Other objects of the present invention relate to the way in which the platform is adapted to receive a mounting arm for a caster-like pilot wheel; the way in which such last mentioned wheel and the rear wheel and axle assembly are mounted to permit adjustment of the cutting height of the blade; the way in which the handle bars are adjustably mounted; and the manner of bracing the entire mower through an interconnection between the handle bars and the supporting arm of the pilot wheel.

Other more minor objects will be made clear or become apparent as the following specification progresses, reference being had to the accompanying drawing, wherein:

Fig. 1 is a top plan view of a hand-propelled lawn mower with power driven cutting mechanism made in accordance with my present invention, parts being broken away for clearness.

Fig. 2 is a side elevational view thereof, parts being broken away to reveal details of construction.

Fig. 3 is a substantially, central, vertical, cross-sectional view through the platform assembly per se; and Fig. 4 is an enlarged, fragmentary, detailed cross-sectional view taken on line IV—IV of Fig. 2.

As is readily apparent in the drawing, the lawn mower forming the subject matter hereof is of the type having a prime mover 10, provided with a substantially vertically disposed drive shaft 12 that in turn has an elongated cutter blade 14 secured to the lowermost end thereof.

The prime mover 10 is supported upon a platform broadly designated by the numeral 16 and shown with clearness in Fig. 3. Platform 16 is in turn supported by a pair of spaced apart rear wheels 18 and 20 mounted upon a substantially horizontal axle 22 and by a forwardmost pilot wheel 24 rotatably mounted on an axle 26 parallel with the axle 22.

The platform 16 comprises a main substantially dome-shaped housing 28 that has a down-turned flange portion or side wall 30. The housing 28 is circular and accordingly, the side wall 30 defines a complete continuous annulus with the exception only of a cut-away portion 32 in the form of an arcuate, segmental notch. As aforesaid, the housing 28 has a top wall 34 that is dome-shaped and provided with a flat, centrally disposed circular top portion 36. This flat portion 36 of the dome-shaped top wall 34 has a relatively small opening 38 for clearing the drive shaft 12 of prime mover 10.

Prime mover 10 is provided with a flat circular base 40 that rests directly upon the uppermost face of the flat portion 36 of wall 34 and is secured directly thereto through the medium of a plurality of bolts or the like 42.

A bearing 44 is provided for the shaft 12 and is disposed within the housing 28 directly below the flat portion 36 of top wall 34. Bearing 44 has a flat, circular top plate 46, a plurality of reinforcing webs 48 underlying plate 46, and a bore 50 therethrough for rotatably receiving the drive shaft 12.

Bore 50 is in direct alignment with the opening 38 and is secured to the plate portion 36 as well as to the base 40 of prime mover 10 by means of a number of bolts 52. An arcuate arm 54 extends upwardly and forwardly from the housing 28 to which it is connected by a number of fastening elements 56. The lowermost end of the arm 54 is contoured to the shape of walls 34 and 30 and the fastening elements 56 secure arm 54 to both of said walls. Arm 54 is disposed at the normally forwardmost end of the housing 28 in diametrically opposed relationship to the notch 32 of wall 30.

The platform 16 includes in addition to the housing 28, a hollow case broadly designated by the numeral 58. Case 58 has a flat top wall 60 horizontally disposed within the same plane as the top portion 36 of housing wall 34. The forwardmost edge of the wall 60 is cut away arcuately as at 62 to clear the circular base 40 of prime mover 10 and to conform to the contour of the dome-shape wall 34, the entire forwardmost edge of wall 60 being welded directly to the wall 34. Case 58 is also provided with a pair of opposed downwardly extending and spaced apart parallel side walls 64 integral with the flat top wall 60 and contoured at the forwardmost edges thereof as at 66 to conform to the walls 30 and 34 of housing 28. These forwardmost edges 66 of side walls 64 are also welded directly to the housing 28. The distance between the side walls 64 is greater than the length of the arcuate notch 32 and casing 58 is disposed to entirely encompass the notch 32. Accordingly, as is clear in Fig. 3, portions of the side wall 30 extend into casing 58. Similarly, a segmental portion of the dome-shaped top wall 34 extends into casing 58 in direct underlying relationship to the top wall 60.

Casing 58 has a rearmost end wall that includes a portion 68 extending at an angle downwardly and outwardly from the rearmost edge of wall 60 and a portion 70 integral with portion 68 and extending vertically downwardly therefrom in substantial parallelism with the plane of wall 30. The portion 70 of the end wall of case 58 is spaced from the housing 28 and terminates at its lowermost edge above the lowermost edges of the side walls 64. Since the said lower edges of side walls 64 are adjacent the lower edge of housing 28, the lower edge of end wall section 70 is spaced a higher distance from the ground when the mower is placed in use than the housing 28. Each side wall 64 of the case 58 is provided with a number of vertically aligned openings 72 for selectively receiving the axle 22, axle 22 accordingly spanning the distance across the case 58 and extending at each end thereof beyond the outermost faces of side walls 64 for receiving the wheels 18 and 20. Since the distance between the side walls 64 is appreciably less than the over-all diameter of the housing 28, and further, since the wheels 18 and 20 are disposed next adjacent their respective side walls 64, it is seen, as is clear in Fig. 1, that the cutting blade 14 which has a length that is only slightly less than the inside diameter of side wall 30, overlaps the paths of travel of wheels 18 and 20.

In addition to the openings 72 providing means to adjust the cutting height of blade 14, the forwardmost end of the platform 16 is adjustable through the following structure.

The forwardmost and upper end of the arm 54 has a bearing 74 for receiving a vertical pin 76 that passes through bight portion 78 of a fork 80. The lowermost end of the fork 80 receives the axle 26 and wheel 24 is rotatably disposed between the legs of fork 80. The lowermost end of pin 76 is held in place by a transverse cotter key or the like 82, and a plurality of washers 84 are threaded upon the pin 76 on both sides of the bearing 74. A second cotter key or like fastening means 86 on the uppermost end of the pin 76, holds the entire assembly in place. It is seen that the height of the arm 54 and accordingly of the forwardmost end of housing 82 is determined by the positioning of the washers 84. The adjustment can be simply accomplished by placing more or fewer washers 84 between the bearing 74 and the bight 78 of fork 80.

The casing 58 of platform 60 serves additionally to mount a handle bar comprising a pair of rods 86 of identical character and spaced apart at the lowermost ends thereof to embrace the case 58. Said lower ends of the rods 86 lie flatly against the outermost faces of the side walls 64 and are provided with a plurality of openings 88 for selectively receiving a pin or bolt 90 serving as a means of fastening the rods 86 to the walls 64.

Rods 86 incline upwardly and rearwardly from the casing 58 and terminate at their uppermost ends in opposed hand grips 92. An arcuate brace or supporting member 94 interconnects the handle bar rods 86 with the arm 54.

A pin 96 joins the lowermost end of rod 94 to the arm 54 and a transverse pin 98 interconnecting the rods 86 intermediate the ends thereof, joins the brace member 94 to rods 86.

A plurality of openings 100 in the uppermost end of the brace 94 selectively receive the cross pin 98. Accordingly, the height of the handle portions 92 may be adjusted to suit the desire of the operator and in accordance with the height of the platform 16 by changing the position of the bolts 90 with respect to the openings 88. Similarly, the angularity of the handle bar portions 86 may be changed by moving the cross pin 98 into differing openings 100. The brace arm 94 not only supports the handle portions 86, but affords complete control by the operator of the pilot wheel 24 since force supplied to the handle portions 92 will be imparted to the arm 54 through brace member 94. If the operator desires to raise the pilot wheel 24 in turning operations or for other reasons, a downward movement on handle portions 92 will raise wheel 24 through the brace member 94.

It is seen that when the mower is placed in use, grass cuttings within the housing 28 are free to drop downwardly and such cuttings as tend to cling to the blade 14 will be forced from housing 28 through the cut-away notch 32 and thence into the casing 58 for final discharge below the end wall section 70. The operator is completely protected against injury since it is virtually impossible for his foot to reach the whirling blade 14 even though he happens to pull the mower to move the wall section 70 over his foot. For the most part, wall section 70 will prevent the operator's foot from entering housing 58 but even if such condition should take place, the end wall section 70 will strike the operator's ankle and prevent injury to the foot.

The outstanding strength and durability of the entire platform 60 and particularly the housing portion 28 thereof, is apparent because of the shape thereof. The flimsy and yieldable flat type of platform will not adequately support a relatively heavy prime mover and is not capable of absorbing the shocks and vibration that takes place when blade 14 rotates. The drum-like housing 28 is entirely self-sustaining and needs no additional braces whatsoever to absorb such vibration and present a solid supporting foundation for the prime mover 10, drive shaft 12 and the cutting blade 14. By making the housing 28 conform as closely as possible to the path of travel of blade 14, the mower can be moved into close relationship with walls, hedges and the like since no protruding platform parts are presented to hinder such close operation.

Accordingly, while details of construction have been set forth hereinabove, it is apparent that it is desired to be limited solely the broad principles hereof and such changes and modifications as fairly come within the scope of the appended claim, are contemplated hereby.

Having thus described my invention, what I claim as new and desire to secure by Letters Patent is:

In a platform for lawn mowers, a hollow housing having a fully open bottom; a vertical side wall, and a top wall integral with the upper edge of said side wall, said top being dome-shaped and having a flat portion at the apex thereof, the base edge of said top portion being circular, said side wall being arcuate to conform with said base edge, said side wall having a portion thereof entirely cut away to present a segmental notch therein; and a laterally extending, open bottom, hollow body overlapping a portion of said top wall and a portion of said side wall, said body having a flat top wall disposed within the plane of said flat portion of said top wall of the housing, said notch in the side wall being within the body, said body having a wall extending downwardly from said top wall thereof in spaced, overlapping relationship to said notch.

PAUL W. HAINKE.

REFERENCES CITED

The following references are of record in the file of this patent:

UNITED STATES PATENTS

| Number | Name | Date |
|---|---|---|
| 2,308,076 | Hainke | Jan. 12, 1943 |
| 2,466,620 | Swift et al. | Apr. 5, 1949 |
| 2,521,972 | Haglund et al. | Sept. 12, 1950 |